(12) United States Patent
Bang et al.

(10) Patent No.: US 7,280,916 B2
(45) Date of Patent: Oct. 9, 2007

(54) METHOD AND APPARATUS FOR COMPENSATING FOR ACCELERATION ERRORS AND INERTIAL NAVIGATION SYSTEM EMPLOYING THE SAME

(75) Inventors: Won-chul Bang, Seongnam-si (KR); Dong-yoon Kim, Seoul (KR); Wook Chang, Seoul (KR); Kyoung-ho Kang, Yongin-si (KR); Eun-seok Choi, Anyang-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 657 days.

(21) Appl. No.: 10/867,767

(22) Filed: Jun. 16, 2004

(65) Prior Publication Data

US 2004/0260468 A1    Dec. 23, 2004

(30) Foreign Application Priority Data

Jun. 16, 2003    (KR) ...................... 10-2003-0038682

(51) Int. Cl.
*G01C 21/16* (2006.01)
(52) U.S. Cl. .................... 701/220; 701/221; 73/178 R; 342/357.14
(58) Field of Classification Search ................ 701/200, 701/23, 220, 221; 73/178 R; 342/357.14
See application file for complete search history.

(56) References Cited

U.S. PATENT DOCUMENTS 5,789,671 A    8/1998    Fernandez
5,794,078 A *  8/1998    Okazaki ...................... 396/50
5,870,056 A *  2/1999    Fowler ....................... 342/424
5,982,164 A * 11/1999    Czarnecki et al. ....... 324/76.33
6,292,751 B1   9/2001    Frank
2002/0173910 A1 11/2002  McCall et al.

FOREIGN PATENT DOCUMENTS

| DE | 3443317 A1 | 6/1986 |
|----|------------|--------|
| JP | 10-307032 A | 11/1998 |
| JP | 11-023276 A | 1/1999 |

\* cited by examiner

*Primary Examiner*—Y. Beaulieu
(74) *Attorney, Agent, or Firm*—Sughrue Mion, PLLC

(57) ABSTRACT

Provided are a method and apparatus for compensating for an acceleration error in an inertial navigation system (INS). The apparatus includes a motion detector that detects the motion of the INS and outputs information on stationary time intervals during which the INS is stationary and a moving time interval during which the INS is moving; a sensor portion that measures accelerations of the INS for the stationary time intervals and moving time interval, respectively; an error model determiner that determines an acceleration error corresponding to the moving time interval using accelerations measured during the stationary time intervals and outputs an acceleration subjected to correction of the acceleration error for the moving time interval; and a position calculator that integrates the corrected acceleration for the moving time interval and outputs the position of the INS.

32 Claims, 7 Drawing Sheets

US 7,280,916 B2

METHOD AND APPARATUS FOR COMPENSATING FOR ACCELERATION ERRORS AND INERTIAL NAVIGATION SYSTEM EMPLOYING THE SAME

BACKGROUND OF THE INVENTION

This application is based upon and claims the benefit of priority from Korean Patent Application No. 2003-38682, filed on Jun. 16, 2003, in the Korean Intellectual Property Office, the disclosure of which is incorporated herein in its entirety by reference.

1. Field of the Invention

The invention relates to a method and apparatus for correcting acceleration errors, and more particularly, to a method and apparatus for compensating for an error in position determined by an inertial navigation system (INS), an INS therefor, and a method which calculates a position in the INS.

2. Description of the Related Art

Typically, inertial sensors, including tri-axial acceleration sensors and tri-axial gyroscopes, are used to measure the position and orientation of a moving object of interest in a three-dimensional space. While INS orientation is obtained by solving differential equations to integrate angular velocities measured by the gyroscopes, position is obtained by removing gravity components from accelerations measured by the acceleration sensors, taking into account the INS orientation, and then calculating double integrals of the accelerations with respect to time. In this case, since INS orientation error derived from error in the gyroscope measurement increases with time, errors in the accelerations from which the gravity components have been removed also increase with time.

Thus, position errors of the INS due to errors in the acceleration sensor measurement and in the gyroscope measurement grow in proportion to the square of time and the cube of time, respectively. Since the INS errors dramatically increase over time in this way, it is very hard to calculate the position over a relatively long period of time using inertial sensors. The solution to overcome this problem is to correct errors in the acceleration sensors and gyroscopes, which is known in the art. Conventional methods for correcting errors in acceleration sensors will now be examined.

When the INS makes frequent stops during movement, zero velocity updates (ZUPTs or ZVUs), coordinate updates (CUPTs), and orientation updates are widely used to correct sensor errors. The ZUPTs are processes to reset a velocity of the INS to zero if the INS is detected to be stationary. The CUPTs are processes to reset an origin, when the INS reaches a predetermined position, to the predetermined position. The orientation update is a process to reset an orientation at the origin, when the INS takes a predetermined orientation, to the predetermined orientation. These methods can be performed in real time but only allow corrections at specific moments. Thus, errors begin to accumulate again after the corrections are performed. As shown in FIG. 1, when an INS stops again after ZUPTs are performed to correct velocity errors while the INS is held still, the velocity does not return to zero, which means that velocity errors increase over time until the velocity errors get re-corrected.

To overcome this problem, U.S. Pat. No. 6,292,751 discloses a method for correcting acceleration errors caused while an INS is in motion. This method assumes acceleration errors are constant. An acceleration error is calculated under a condition that a velocity is zero at the time when the INS starts to move and stops. Then, the error is subtracted from the measured acceleration and the resulting value is doubly integrated with respect to time in order to determine the position. FIG. 2 shows a process of compensating for velocity errors through acceleration error correction.

Referring to FIG. 2, the INS starts to move at time t1 and stops at time t2. This method assumes that an acceleration error during motion of INS is constant. FIG. 2A shows a measured acceleration A of the INS and an acceleration error d indicated by a dotted line. As shown in FIG. 2B, a velocity, which is obtained by integrating the acceleration A, is a first-order function. Since a velocity of the INS is 0 at time t1 before starting to move, the velocity of the INS at time t1 can be corrected to 0 as shown in FIG. 2C. Since the velocity is 0 at time t2, a velocity error within an interval between t1 and t2 indicated by the dotted line is subtracted from the velocity depicted by a solid line to produce the one shown in FIG. 2D. The resulting corrected velocity can be integrated to yield a position. However, since it is assumed that an acceleration error is constant, large discrepancies occur between the calculated position and the actual position.

SUMMARY OF THE INVENTION

The invention provides a method and apparatus for compensating for errors in acceleration sensors by modeling the errors in a novel scheme, an inertial navigation system (INS), and a method therefor which employs the same for calculating accurate position and orientation.

According to an aspect of the invention, there is provided an apparatus for compensating for an acceleration error including: a first acceleration error calculator that approximates acceleration information for a stationary time interval when a system is stationary by first-order functions to calculate acceleration errors for the stationary time interval; a zero velocity compensator that compensates system velocities for the stationary time intervals and accelerations derived from the velocities; and a second acceleration error calculator that calculates an acceleration error for a moving time interval when the system is moving using the approximated acceleration errors for the stationary time intervals and outputs a corrected acceleration the moving time interval.

Here, the second acceleration error calculator may determine a slope of the acceleration error for the moving time interval using a first slope of a first first-order function approximating an acceleration error for a stationary time interval before the moving time interval, and a second slope of a second first-order function approximating an acceleration error for a stationary time interval after the moving time interval. Also, the second acceleration error calculator may determine the slope of the acceleration error for the moving time interval using a first first-order function value produced when the system undergoes a first transition from a first stationary state to a moving state, and a second first-order function value produced when the system undergoes a second transition from the moving state to a second stationary state.

According to another aspect of the invention, there is provided an INS including: a motion detector that detects the motion of the INS and outputs information on stationary time intervals when the INS is stationary and a moving time interval when the INS is moving; a sensor portion that measures accelerations of the INS during the stationary time intervals and the moving time interval; an error model determiner that determines an acceleration error of the moving time interval using the accelerations measured during the stationary time intervals, and outputs a corrected acceleration for the moving time interval; and a position calculator that integrates the corrected acceleration for the moving time interval and outputs the position of the INS.

According to another aspect of the invention, there is provided a method for compensating for an acceleration error including: approximating acceleration errors for the stationary time intervals by first-order functions using acceleration information about the stationary time intervals; performing zero velocity updates to correct the accelerations for the stationary time intervals; approximating an acceleration error for the moving time interval by a first-order function using the acceleration errors approximated for the stationary time intervals; and subtracting the acceleration error for the moving time interval from the acceleration information and calculating a corrected acceleration for the moving time interval.

In the approximating of the acceleration error for the moving time interval, a slope of the acceleration error for the moving time interval is determined using a first slope of a first first-order function approximating an acceleration error for a stationary time interval before the moving time interval, and a second slope of a second first-order function approximating an acceleration error for a stationary time interval after the moving time interval. Also, the slope of the acceleration error for the moving time interval is determined using a first first-order function value produced when the system undergoes a first transition from a first stationary state to a moving state and a second first-order function value produced when the system undergoes a second transition from the moving state to a second stationary state.

According to another aspect of the invention, there is provided a method for calculating the position of an INS including: recording acceleration information of the INS, indicating stationary time intervals when the INS is stationary and a moving time interval when the INS is moving; approximating acceleration errors for the stationary time intervals by first-order functions using the acceleration information for the stationary time intervals, and performing zero velocity updates to correct the accelerations for the stationary time intervals; approximating an acceleration error for the moving time interval by a first-order function using the acceleration errors for the stationary time intervals, and calculating a corrected acceleration for the moving time interval; and calculating the position of the INS using the corrected accelerations for the stationary and moving time intervals.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF THE INVENTION

Exemplary embodiments of the invention will now be described below by reference to the attached Figures. The described exemplary embodiments are intended to assist the understanding of the invention, and are not intended to limit the scope of the invention in any way.

Figure 1:
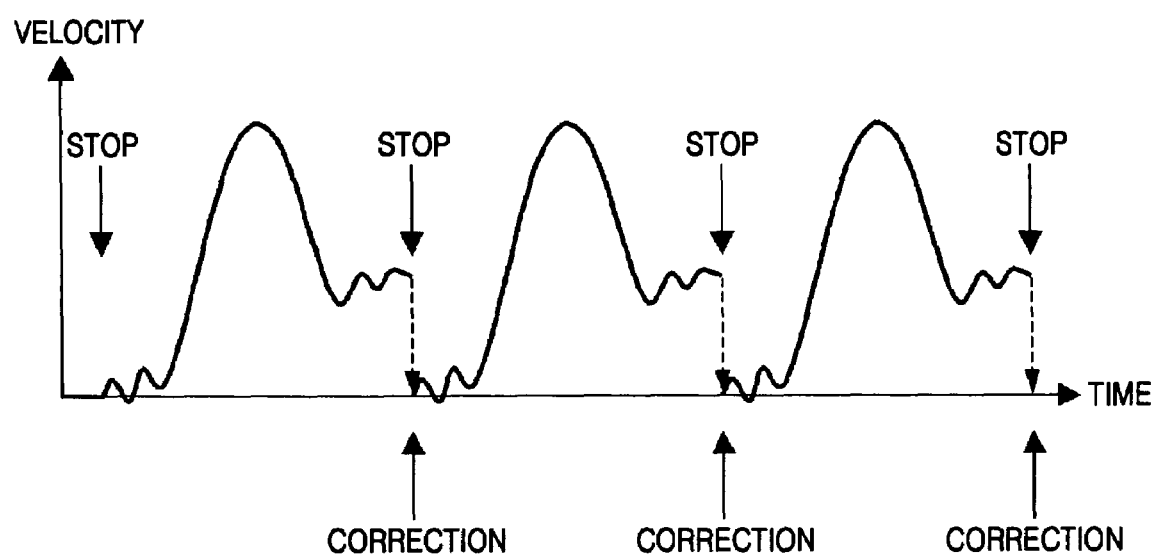
FIG. 1 is a graph illustrating a conventional zero velocity update used in an inertial navigation system (INS)
Figure 2A:
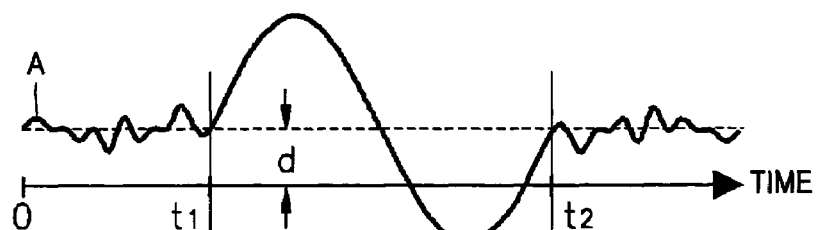
FIGS. 2A through 2D illustrate a process of compensating for velocity errors using a conventional acceleration error correction technique.
Figure 2B:
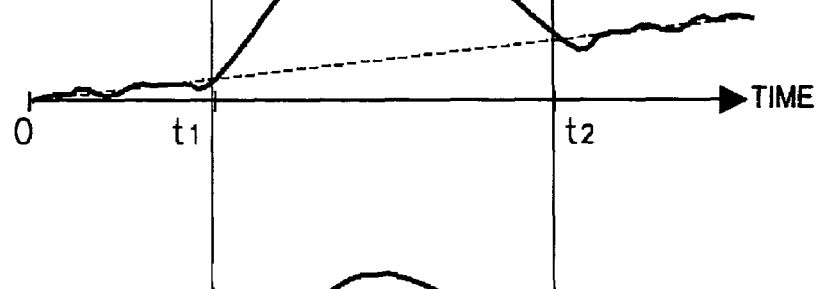
Figure 2C:
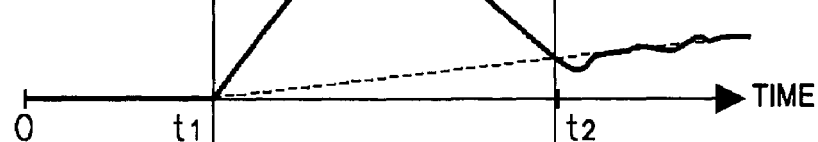
Figure 2D:
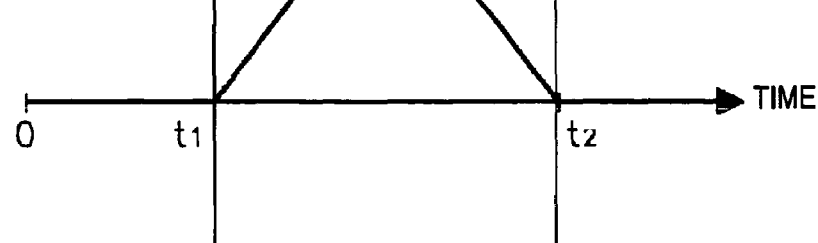
Figure 3:
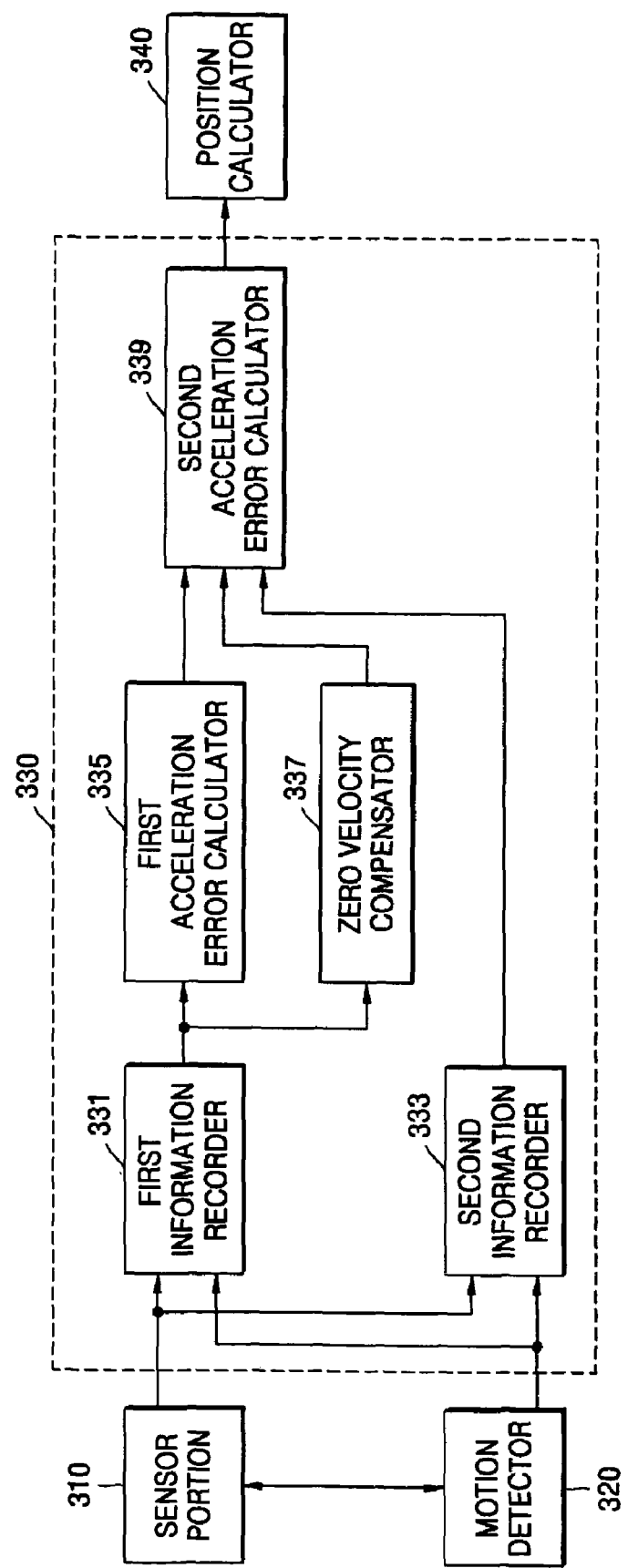
FIG. 3 is a block diagram showing the configuration of an INS using an acceleration error compensation method according to an exemplary embodiment of the invention.

Referring to FIG. 3, an inertial navigation system (INS) according to the invention includes a sensor portion 310 comprising acceleration sensors and gyroscopes that measure three axis acceleration and three axis angular velocity, respectively, along three axes, a motion detector 320 that determines whether the INS including the sensor portion 310 is stationary, an acceleration error model determiner 330 that determines a linear model for an acceleration sensor error, and a position calculator 340 that calculates an actual position of the INS from an acceleration compensated using the linear model. The motion detector 320, if in direct control of the motion of the INS, simply outputs the time when the INS including the sensor portion 310 is moving or stationary. Otherwise, if the motion of the INS is controlled by an external factor, the motion detector 320 determines that the INS is stationary if a value measured by the sensor portion 310 is less than a predetermined threshold and determines that the INS is moving if the measured value is greater than the threshold.

The acceleration error model determiner 330 includes first and second information recorders 331 and 333, a zero velocity compensator 337, and first and second acceleration error calculators 335 and 339. The first information recorder 331 records acceleration information while the INS is stationary, i.e., before it starts moving or after it stops moving. The first acceleration error calculator 335 approximates the acceleration for a time interval when the INS is stationary ("stationary time interval") by a linear function and calculates an error in the acceleration for the stationary time interval. The zero velocity compensator 337 corrects for the INS velocity and acceleration for the stationary time interval. The second information recorder 333 records acceleration information measured while the INS is moving. The second acceleration error calculator 339 calculates an acceleration for a time interval when the INS is moving ("moving time interval") corrected by using the approximated acceleration error and the corrected zero velocity corresponding to the stationary time interval. The position calculator 340 performs a double integral of the corrected acceleration calculated by the acceleration error model determiner 330 and calculates an INS position.

Figure 4:
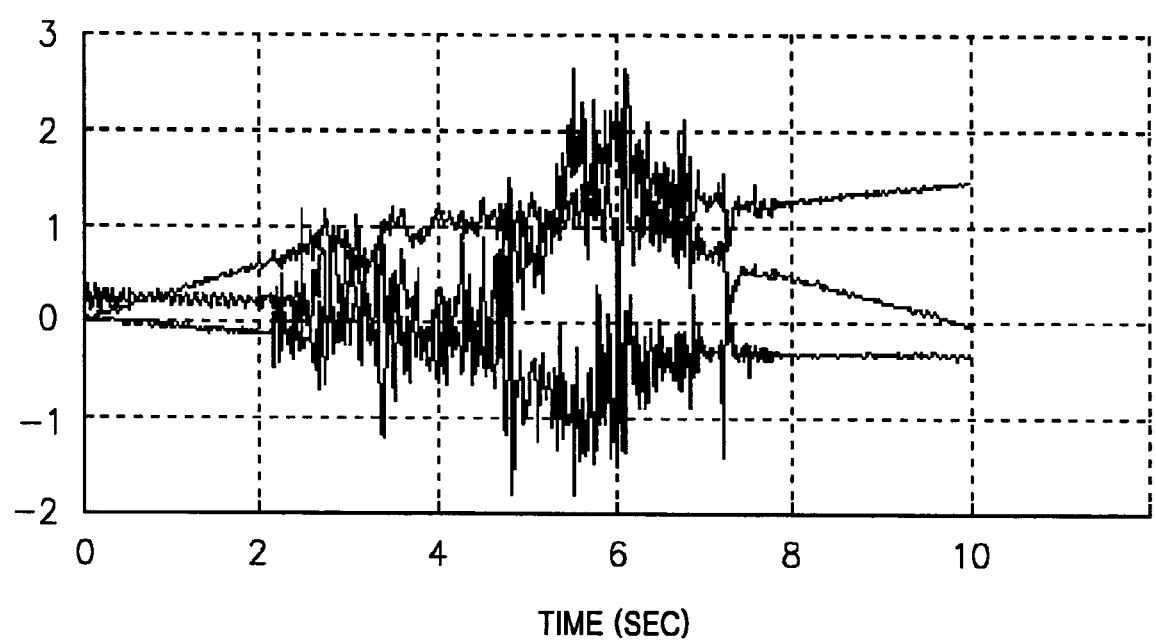
FIG. 4 shows an acceleration in an absolute coordinate system measured by the sensor portion 310 shown in FIG. 3.

FIG. 4 shows acceleration in an absolute coordinate system measured by the sensor 310. The theoretical background of the invention will now be described with reference to FIG. 4. The invention is proposed to overcome the limit posed by conventional technology where an acceleration error is modeled as a constant; the invention proposes additional conditions for modeling an acceleration error derived while the INS is moving as a first-order equation.

Conventionally, when measured acceleration and acceleration error in an absolute coordinate system are denoted by A and d, respectively, actual acceleration Â can be defined by Equation (1):

$$A = \hat{A} + d \quad (1)$$

However, an experiment was conducted to reveal that an actual acceleration error is not constant like in Equation (1), but linearly changes within a few seconds. Three curves in FIG. 4 represent accelerations measured in an absolute coordinate system, along x, y, and z axes, when the INS starts to move after 2 seconds and stops after 8 seconds. According to INS theory, since integration must be performed to calculate an acceleration in a absolute coordinate system from accelerations and angular velocities measured by an inertial sensor system along three axes, errors in the acceleration in the absolute coordinate system accumulate with time even when the INS is completely stationary. As is evident from the curves in FIG. 4, the acceleration is not 0 during intervals between 0 and 2 seconds and between 8 and 10 seconds when the INS is actually stationary.

While the acceleration error is not constant during a stationary time interval, but increases or decreases linearly as shown in FIG. 4, the way in which an acceleration error changes during a moving time interval cannot be known. To model the error as an n-th order polynomial, n+1 coefficients must be determined, which requires n+1 conditional expressions. Since the only intuitively known condition is that the velocity is 0 when the INS is stationary, the invention provides additional conditions that allow an acceleration sensor measurement error in an absolute coordinate system to be modeled as a first-order expression in the form at+b. As a result, the relationship between the actual acceleration Â and measured acceleration A is defined by Equation (2), thus providing a method for determining an acceleration that more closely approximates the actual acceleration:

$$A = \hat{A} + at + b \quad (2)$$

Figure 5:
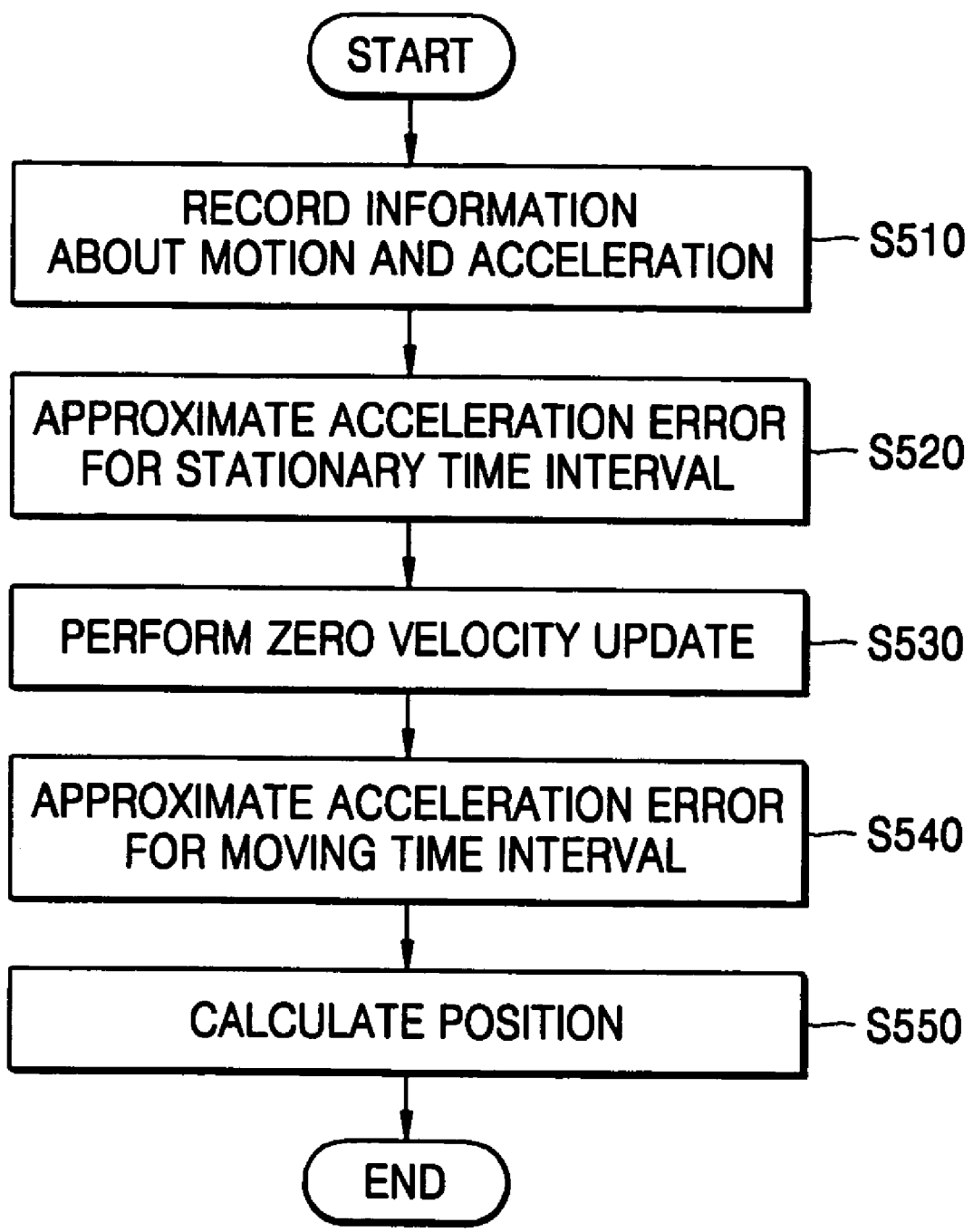
FIG. 5 is a flowchart illustrating a method for compensating for an acceleration error according to an exemplary embodiment of the invention.

FIG. 5 is a flowchart illustrating a method for compensating for an acceleration error according to an exemplary embodiment of the invention, and FIG. 6 shows accelerations measured and corrected in each step of the method illustrated in FIG. 5.

In step S510, when an INS starts to operate, accelerations along three axes sensed by the acceleration sensors contained in the sensor portion 310, and motion information detected by the motion detector 320, are input to the first and second information recorders 331 and 333. The first information recorder 331 records the input accelerations along three axes corresponding to a time interval when the motion detector 320 senses that the INS is stationary, and outputs the recorded acceleration information to the first acceleration error calculator 335 and the zero velocity compensator 337. The second information recorder 333 records the input accelerations along three axes for a time interval t between t1 and t2 when the motion detector 320 senses that the INS is moving, and outputs the recorded accelerations to the second acceleration error calculator 339.

Figure 6A:
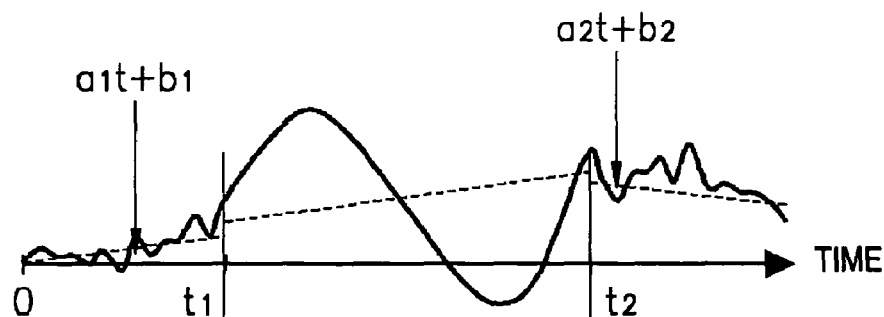
FIGS. 6A through 6C show accelerations measured and corrected in each step of the method illustrated in FIG. 5.

In step S520, the first acceleration error calculator 335 performs a linear regression on the accelerations recorded for a time interval between 0 and t1 before the INS starts to move to obtain a straight line $a_1 t + b_1$, linearly approximated as shown in FIG. 6A. Similarly, the first acceleration error calculator 335 performs a linear regression on the accelerations recorded for a time interval after t2 when the INS stops moving to obtain a straight line $a_2 t + b_2$, linearly approximated as shown in FIG. 6A. The approximated straight lines are output to the second acceleration error calculator 339.

Figure 6B:
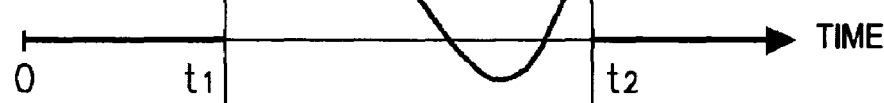

In step S530, the zero velocity compensator 337 performs a zero velocity update (ZUPT) on velocities for stationary time intervals received from the first information recorder 331. That is, as described above, it can be known intuitively that the INS has 0 velocity during the stationary time intervals between 0 and t1 and after t2, and thus has 0 accelerations during the same intervals. Thus, the zero velocity compensator 337 corrects the accelerations during the stationary time intervals to 0 as shown in FIG. 6B and then outputs the corrected acceleration information to the second error acceleration calculator 339.

In step S540, the second error acceleration calculator 339 approximates an acceleration error at+b in the moving time interval using the approximated acceleration errors $a_1 t + b_1$ and $a_2 t + b_2$. Then, the second acceleration error calculator 339 determines slope a and constant b of the approximated acceleration error for the moving time interval.

A method for determining an approximated acceleration error derived during a moving time interval according to a first embodiment of the invention will now be described. In the first embodiment, the second acceleration error calculator 339 determines a slope a of the approximated acceleration error at+b in an absolute coordinate system using slopes of the approximated acceleration errors for stationary time intervals as shown in Equation (3):

$$a = \frac{(a_1 + a_2)}{2} \quad (3)$$

Based on intuition that the acceleration error measured from the INS continuously varies, the slope of the acceleration error for the moving time interval is determined by averaging slopes of the acceleration errors for the stationary time intervals.

Meanwhile, since the INS velocity is 0 at times t1 and t2, the constant b can be obtained from the condition shown in Equation (4), i.e., the condition that an integral of the actual acceleration Â obtained after correcting errors in the measured acceleration shown in FIG. 6 between t1 and t2 should be equal to 0.

$$\int_{t_1}^{t_2} \hat{A} dt = \int_{t_1}^{t_2} \{A - (at + b)\} dt = 0 \quad (4)$$

(4)

Equation (4) can be rearranged to isolate constant b as shown in Equation (5):

$$b = \frac{\int_{t_1}^{t_2} (A - at) dt}{t_2 - t_1} \quad (5)$$

The acceleration error at+b for the moving time interval between t1 and t2 obtained by Equations (3) and (5) is shown in FIG. 6B along with the curve of an acceleration A', subjected to a ZUPT.

The second acceleration error calculator 339 subtracts the calculated acceleration error at+b from the acceleration corresponding to the moving time interval input from the second information recorder 333 and then determines a corrected acceleration A" in the absolute coordinate system using Equation (6):

$$A'' = A - (at + b) \qquad (6)$$

Figure 6C:
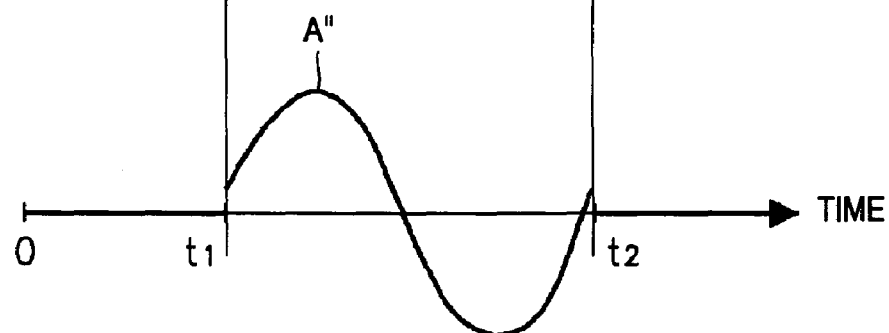

FIG. 6C shows the acceleration curve subjected to ZUPT and the error correction for the moving time interval.

Meanwhile, the second acceleration error calculator 339 according to a second exemplary embodiment of the invention determines the slope a of the acceleration error using acceleration errors $a_1t_1+b_1$ and $a_2t_2+b_2$ at time t1 and t2, instead of using Equation (3) above. That is, the second acceleration error calculator 339 determines the slope a of the approximated acceleration error straight line using Equation (7):

$$a = \frac{(a_2t_2 + b_2) - (a_1t_1 + b_1)}{t_2 - t_1} \qquad (7)$$

Every process in the second embodiment, except the process of calculating the slope a of the acceleration error straight line, is the same as in the first embodiment.

The position calculator 340 performs a double integral on the corrected acceleration A" received from the second acceleration error calculator 339 and calculates a position P of the INS.

$$P(t) = \int_1 \int_1^2 A''(\tau_1) d\tau_1 d\tau_2 = \int_1 \int_1^2 (A - at - b)(\tau_1) d\tau_1 d\tau_2 (t_1 \le t \le t_2) \qquad (8)$$

Figure 7A:
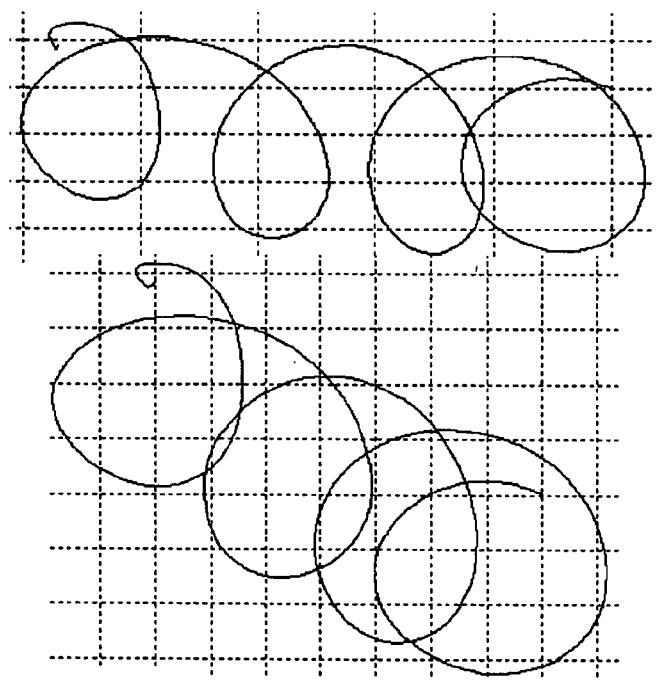
FIGS. 7A and 7B show a performance comparison between a handwriting recovery device using a conventional INS and a handwriting recovery device using an INS performing an acceleration error compensation method according to the invention.
Figure 7B:
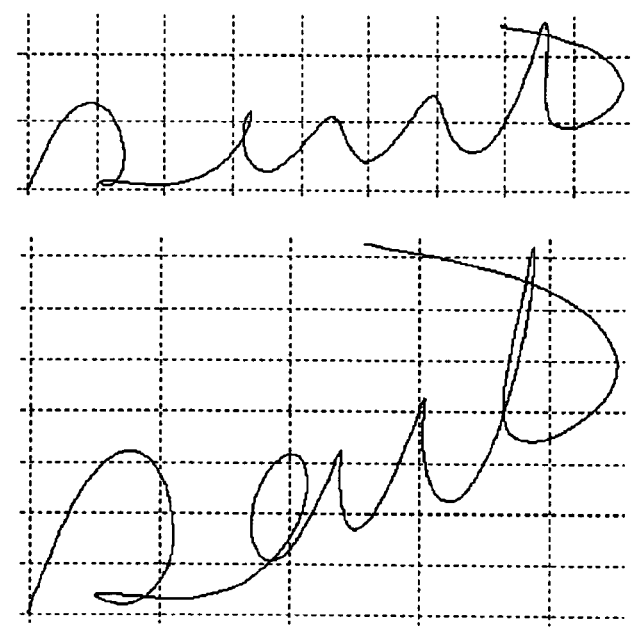

FIGS. 7A and 7B show a performance comparison between a handwriting recovery device using a conventional INS and a handwriting recovery device using an INS performing an acceleration error compensation method according to the invention. When the same four circles are drawn in the air using a handwriting recovery device, an upper picture of FIG. 7A shows a position locus calculated by conventional technology and a lower picture shows one calculated by the invention. As is evident from FIG. 7A, the circles calculated by the invention overlap one another more than the circles calculated by the conventional technology.

When a word "sait" is drawn in the air using a handwriting recovery device, an upper part of FIG. 7B shows a position locus calculated by conventional technology and a lower part of FIG. 7B shows a position locus calculated by the invention. As is evident from FIG. 7B, the position locus calculated by the invention is more similar to the word "sait" in handwriting than the position locus calculated by the conventional technology.

The invention can also be embodied as computer readable codes on a computer readable recording medium. The computer readable recording medium is any data storage device that can store data, which can be thereafter be read by a computer system. Examples of the computer readable recording medium include read-only memory (ROM), random-access memory (RAM), CD-ROM, magnetic tape, floppy disks, optical data storage devices, and carrier waves (such as data transmission over the Internet). The computer readable recording medium can also be distributed over a network of coupled computer systems so that the computer readable code is stored and executed in a de-centralized fashion.

While this invention has been particularly shown and described with reference to exemplary embodiments thereof, it will be understood by those skilled in the art that various changes in form and details may be made therein without departing from the spirit and scope of the invention as defined by the appended claims and their equivalents.

The invention overcomes the limit of conventional technology, which treats acceleration error as a constant, and allows the acceleration error to be modelled more closely to the actual acceleration error, thus eliminating acceleration errors intrinsic to the INS more effectively while enabling accurate calculation of the position and orientation of a moving three-dimensional object.

What is claimed is:

1. An inertial navigation system (INS) comprising:
    a motion detector that detects motion of the INS and indicates stationary time intervals when the INS is stationary and a moving time interval when the INS is moving;
    a sensor portion that measures accelerations of the INS during the stationary time intervals and the moving time interval;
    an error model determiner that determines an acceleration error of the moving time interval using the accelerations measured during the stationary time intervals, and outputs a corrected acceleration for the moving time interval; and
    a position calculator that integrates the corrected acceleration for the moving time interval and outputs the position of the INS.

2. The INS as claimed in claim 1, wherein the error model determiner approximates stationary acceleration errors for the stationary time intervals and the acceleration error for the moving time interval by first-order functions.

3. The INS as claimed in claim 2, wherein the error model determiner determines a slope of the acceleration error for the moving time interval using:
    a first slope of a first first-order function approximating an acceleration error for a stationary time interval before the moving time interval; and
    a second slope of a second first-order function approximating an acceleration error for a stationary time interval after the moving time interval.

4. The INS as claimed in claim 3, wherein the error model determiner determines the slope of the acceleration error for the moving time interval by averaging the first and second slopes of the first and second first-order functions.

5. The INS as claimed in claim 2, wherein the error model determiner determines a slope of the acceleration error for the moving time interval using:
    a first first-order function value produced when the INS undergoes a first transition from a first stationary state to a moving state; and
    a second first-order function value produced when the INS undergoes a second transition from the moving state to a second stationary state.

6. The INS as claimed in claim 5, wherein the error model determiner determines the slope of the acceleration error for the moving time interval by dividing the difference between the values of the first and second first-order functions by the moving time interval.

7. The INS as claimed in any one of claims 2 through 6, wherein an intercept of the first-order function by which the acceleration error for the moving time interval is approximated is calculated from a condition where an integral of the result of subtracting the measured acceleration from the acceleration error over the moving time interval is equal to zero.

8. The INS as claimed in claim 1, wherein the error model determiner comprises:

a first acceleration error calculator that approximates the accelerations during the stationary time intervals by first-order functions to calculate acceleration errors for the stationary time intervals;

a zero velocity compensator that compensates velocities and accelerations derived from stationary time interval velocities; and a second acceleration error calculator that calculates the acceleration error for the moving time interval using the approximated acceleration errors for the stationary time intervals, and outputs the corrected acceleration.

9. The apparatus as claimed in claim 8, wherein the second acceleration error calculator calculates the corrected acceleration for the moving time interval by subtracting the acceleration error from the measured acceleration of the moving time interval.

10. The INS as claimed in claim 1, wherein the motion detector indicates a moving time interval when the acceleration measured by the sensor portion is greater than a predetermined threshold.

11. An apparatus for compensating for an acceleration error using: received information about stationary time intervals when a system is stationary; a moving time interval when the system is moving; and measured acceleration information for each time interval, the apparatus comprising:

a first acceleration error calculator that approximates accelerations during the stationary time intervals by first-order functions to calculate acceleration errors for the stationary time intervals;

a zero velocity compensator that compensates system velocities for the stationary time intervals and accelerations derived from the velocities; and a second acceleration error calculator that calculates an acceleration error for the moving time interval using the approximated acceleration errors for the stationary time intervals, and outputs a corrected acceleration for the moving time interval.

12. The apparatus as claimed in claim 11, wherein the second acceleration error calculator determines a slope of the acceleration error for the moving time interval using:

a first slope of a first first-order function approximating an acceleration error for a stationary time interval before the moving time interval; and a second slope of a second first-order function approximating an acceleration error for a stationary time interval after the moving time interval.

13. The apparatus as claimed in claim 12, wherein the second acceleration error calculator determines the slope of the acceleration error for the moving time interval by averaging the first and second slopes.

14. The apparatus as claimed in claim 11, wherein the second acceleration error calculator determines a slope of the acceleration error for the moving time interval using:

a first first-order function value produced when the system undergoes a first transition from a first stationary state to a moving state; and a second first-order function value produced when the system undergoes a second transition from the moving state to a second stationary state.

15. The apparatus as claimed in claim 14, wherein the second acceleration calculator determines the slope of the acceleration error for the moving time interval by dividing the difference between the values of the first and second first-order functions by the moving time interval.

16. The apparatus as claimed in claim 11, wherein the second acceleration error calculator calculates the corrected acceleration for the moving time interval by subtracting the acceleration error from the measured acceleration of the moving time interval.

17. The apparatus as claimed in any one of claims 12 through 16, wherein an intercept of the first-order function by which the acceleration error of the system for the moving time interval is approximated is calculated from a condition where an integral of the result of subtracting the measured acceleration from the acceleration error over the moving time interval is equal to zero.

18. A method for calculating a position of an inertial navigation system (INS), the method comprising:

recording acceleration information of the INS;

indicating stationary time intervals when the INS is stationary and a moving time interval when the INS is moving;

approximating acceleration errors for the stationary time intervals by first-order functions using the acceleration information for the stationary time intervals, and performing zero velocity updates to correct the accelerations for the stationary time intervals;

approximating an acceleration error for the moving time interval by a first-order function using the acceleration errors for the stationary time intervals, and calculating a corrected acceleration for the moving time interval; and calculating the position of the INS using the corrected accelerations for the stationary and moving time intervals.

19. The method as claimed in claim 18, wherein a slope of the acceleration error for the moving time interval is determined using:

a first slope of a first first-order function approximating an acceleration error for a stationary time interval before the moving time interval; and a second slope of a second first-order function approximating an acceleration error for a stationary time interval after the moving time interval.

20. The method as claimed in claim 19, wherein the slope of the acceleration error for the moving time interval is determined by averaging the first and second slopes.

21. The method as claimed in claim 18, wherein a slope of the acceleration error for the moving time interval is determined using:

a first first-order function value produced when the system undergoes a first transition from a first stationary state to a moving state; and a second first-order function value produced when the system undergoes a second transition from the moving state to a second stationary state.

22. The method as claimed in claim 21, wherein the slope of the acceleration error for the moving time interval is determined by dividing the difference between the values of the first and second first-order functions by the moving time interval.

23. The method as claimed in claim 18, wherein an intercept of the first-order function by which the acceleration error for the moving time interval is approximated is calculated from a condition where an integral of the result of subtracting the measured acceleration from the acceleration error over the moving time interval is equal to zero.

24. The method as claimed in claim 18, wherein a moving time interval is indicated when the measured acceleration is greater than a predetermined threshold.

25. A recording medium on which the method for calculating the position of the INS, according to any one of the claims 18 through 24, is recorded as a program code that can be read and executed by a computer.

26. A method for compensating for an acceleration error using: received information about stationary time intervals when a system is stationary; a moving time interval when the system is moving; and measured acceleration information for each time interval, the method comprising:

approximating acceleration errors for the stationary time intervals by first-order functions using the acceleration information about the stationary time intervals;

performing zero velocity updates to correct the accelerations for the stationary time intervals;

approximating an acceleration error for the moving time interval by a first-order function, using the acceleration errors approximated for the stationary time intervals; and subtracting the acceleration error for the moving time interval from the acceleration information and calculating a corrected acceleration for the moving time interval.

27. The method as claimed in claim 26, wherein a slope of the acceleration error for the moving time interval is determined using:

a first slope of a first first-order function approximating an acceleration error for a stationary time interval before the moving time interval; and a second slope of a second first-order function approximating an acceleration error for a stationary time interval after the moving time interval.

28. The method as claimed in claim 27, wherein the slope of the acceleration error for the moving time interval is determined by averaging the first and second slopes.

29. The method as claimed in claim 26, wherein the slope of the acceleration error for the moving time interval is determined using:

a first first-order function value produced when the system undergoes a first transition from a first stationary state to a moving state; and a second first-order function value produced when the system undergoes a second transition from the moving state to a second stationary state.

30. The method as claimed in claim 29, wherein the slope of the acceleration error for the moving time interval is determined by dividing the difference between the values of the first and second first-order functions by the moving time interval.

31. The method as claimed in claim 26, wherein an intercept of the first-order function by which the acceleration error for the moving time interval is approximated is calculated from a condition where an integral of the result of subtracting the measured acceleration from the acceleration error over the moving time interval is equal to zero.

32. A recording medium on which the method for compensating for an acceleration error, according to any one of claims 26 through 31, is recorded as a program code that can be read and executed by a computer.

* * * * *